US012609259B2

(12) United States Patent
Kashima

(10) Patent No.: US 12,609,259 B2
(45) Date of Patent: Apr. 21, 2026

(54) SAFETY SWITCH HAVING A LOCK FUNCTION USING AN ELECTROMAGNET

(71) Applicant: Keyence Corporation, Osaka (JP)

(72) Inventor: Hiroshi Kashima, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 249 days.

(21) Appl. No.: 18/229,184

(22) Filed: Aug. 2, 2023

(65) Prior Publication Data

US 2024/0055207 A1 Feb. 15, 2024

(30) Foreign Application Priority Data

Aug. 10, 2022 (JP) ................................ 2022-127763

(51) Int. Cl.
*H01H 50/44* (2006.01)
*H01H 47/22* (2006.01)
*H01H 50/36* (2006.01)

(52) U.S. Cl.
CPC ............ *H01H 50/44* (2013.01); *H01H 47/22* (2013.01); *H01H 50/36* (2013.01)

(58) Field of Classification Search
None
See application file for complete search history.

(56) References Cited

U.S. PATENT DOCUMENTS 5,184,855 A * 2/1993 Waltz .................... E05C 19/168 292/341.16
6,135,515 A * 10/2000 Roth ..................... E05C 19/166 292/DIG. 55
10,948,892 B2 3/2021 Babasaki et al.
11,008,798 B2 5/2021 Kashima et al.
11,551,884 B2 1/2023 Oh et al.
2005/0160777 A1 7/2005 Baechle et al.
2008/0094158 A1 * 4/2008 Schmid ................ H01H 27/002 335/291

FOREIGN PATENT DOCUMENTS

DE 102009059050 B4 10/2017
EP 3517822 B1 10/2020
JP 2016510382 A 4/2016

OTHER PUBLICATIONS

U.S. Appl. No. 18/229,183, filed Aug. 2, 2023 (82 pages).
U.S. Appl. No. 18/229,185, filed Aug. 2, 2023 (101 pages).
U.S. Appl. No. 18/229,187, filed Aug. 2, 2023 (79 pages).
Extended European Search Report issued in corresponding European Patent Application 23184970.4 dated Jan. 9, 2024 (8 pages).

* cited by examiner

*Primary Examiner* — Bernard Rojas
(74) *Attorney, Agent, or Firm* — Kilyk & Bowersox, P.L.L.C.

(57) ABSTRACT

A safety switch that has a lock function using an electromagnet and a member to be magnetized is downsized. The safety switch includes: a detection unit that detects that a movable actuator is within a predetermined range; a safety signal output unit that outputs a safety signal based on a detection result obtained by the detection unit; an electromagnet; a lock input unit that receives a lock instruction for locking movement of the actuator; a drive control unit that drives the electromagnet based on the lock instruction received via the lock input unit; and an attachment portion which is formed on the electromagnet and fixes a switch body to an installation place of the switch body.

15 Claims, 8 Drawing Sheets

SAFETY SWITCH HAVING A LOCK FUNCTION USING AN ELECTROMAGNET

CROSS-REFERENCE TO RELATED APPLICATIONS

The present application claims foreign priority based on Japanese Patent Application No. 2022-127763, filed Aug. 10, 2022, the contents of which are incorporated herein by reference.

BACKGROUND OF THE INVENTION

1. Field of the Invention

The invention relates to a safety switch that has a lock function using an electromagnet and a member to be magnetized.

2. Description of Related Art

In a factory and the like, a peripheral region in the periphery of a mechanical hazard source, such as a press device or a work robot, is comparted by a compartment member such as a safety fence. A human body can be protected from the mechanical hazard source by stopping the operation of the mechanical hazard source when detecting a state in which the human body is likely to enter the peripheral region or an actual entry of the human body in the peripheral region.

The compartment member is provided with an opening/closing portion for allowing the human body to enter and exit the peripheral region. A typical example of the opening/closing portion is a door.

A safety switch is installed in the opening/closing portion. The safety switch has a sensing function of sensing an open or closed state of the opening/closing portion.

A safety system including a safety switch stops the mechanical hazard source when the opening/closing portion is switched from the closed state to the open state.

The safety system is in a "safe state" while a state in which there is no possibility that a human body enters the peripheral region or there is no entry of a human body in the peripheral region has been detected and maintained. In the "safe state", an ON signal is output as a safety signal from the safety switch, and the mechanical hazard source operates.

Then, when the opening/closing portion is switched to the open state from the "safe state" so that the peripheral region is opened, the safety system is no longer in the "safe state". Thus, an OFF signal is output from the safety switch as the safety signal, and the mechanical hazard source is stopped.

Note that, in the safety system, once the OFF signal is output as the safety signal from the safety switch, the mechanical hazard source is not restarted even if the opening/closing portion is set to the closed state thereafter, and the mechanical hazard source is restarted when a reset signal is separately input. The reason why the additional input of the reset signal is required is that, once the peripheral region is opened, even if the opening/closing portion is set to the closed state thereafter, it is difficult to confirm the state where there is no possibility that a human body enters the peripheral region or the absence of an entry of a human body.

One of safety switches has not only a sensing function of sensing an open or closed state of an opening/closing portion but also a lock function of restricting opening of the opening/closing portion (for example, see JP 2016-510382 A (FIG. 6B)). If a worker erroneously changes the opening/closing portion from the closed state to the open state, the mechanical hazard source is stopped, and thus, the production efficiency of a factory or the like deteriorates. The lock function of the safety switch can prevent the opening/closing portion from being erroneously changed from the closed state to the open state by the worker, and thus, contributes to improvement in the production efficiency of the factory or the like.

As an example of the lock function, an electromagnet and a member to be magnetized are used in some cases.

A safety switch having the lock function is inevitably larger than a safety switch having no lock function, which is a problem.

In conventional safety switches provided with the lock function using the electromagnet and the member to be magnetized, a shape of the electromagnet has not been sufficiently studied, and there is room for improvement in the shape of the electromagnet.

SUMMARY OF THE INVENTION

In view of the above problems, an object of the invention is to provide a safety switch that has a lock function using an electromagnet and a member to be magnetized and can be downsized.

According to one embodiment of the invention, a safety switch includes: a detection unit that detects that a movable actuator is within a predetermined range, the actuator includes a member to be magnetized on which a surface to be attracted is formed; a safety signal output unit that outputs a safety signal based on a detection result obtained by the detection unit; an electromagnet on which an attraction surface corresponding to the surface to be attracted is formed; a lock input unit that receives a lock instruction for locking movement of the actuator; a drive control unit that drives the electromagnet to cause the attraction surface of the electromagnet and the surface to be attracted of the actuator to be attracted to each other based on the lock instruction received via the lock input unit; and an attachment portion which is formed on the electromagnet and fixes a switch body to an installation place of the switch body.

Note that other features, elements, steps, advantages, and characteristics will be more apparent from the following detailed description of preferred embodiments and the accompanying drawings.

According to the invention, it is possible to provide the safety switch that has the lock function using the electromagnet and the member to be magnetized and can be downsized.

DETAILED DESCRIPTION OF PREFERRED EMBODIMENTS

Application Example of Safety Switch

Figure 1:
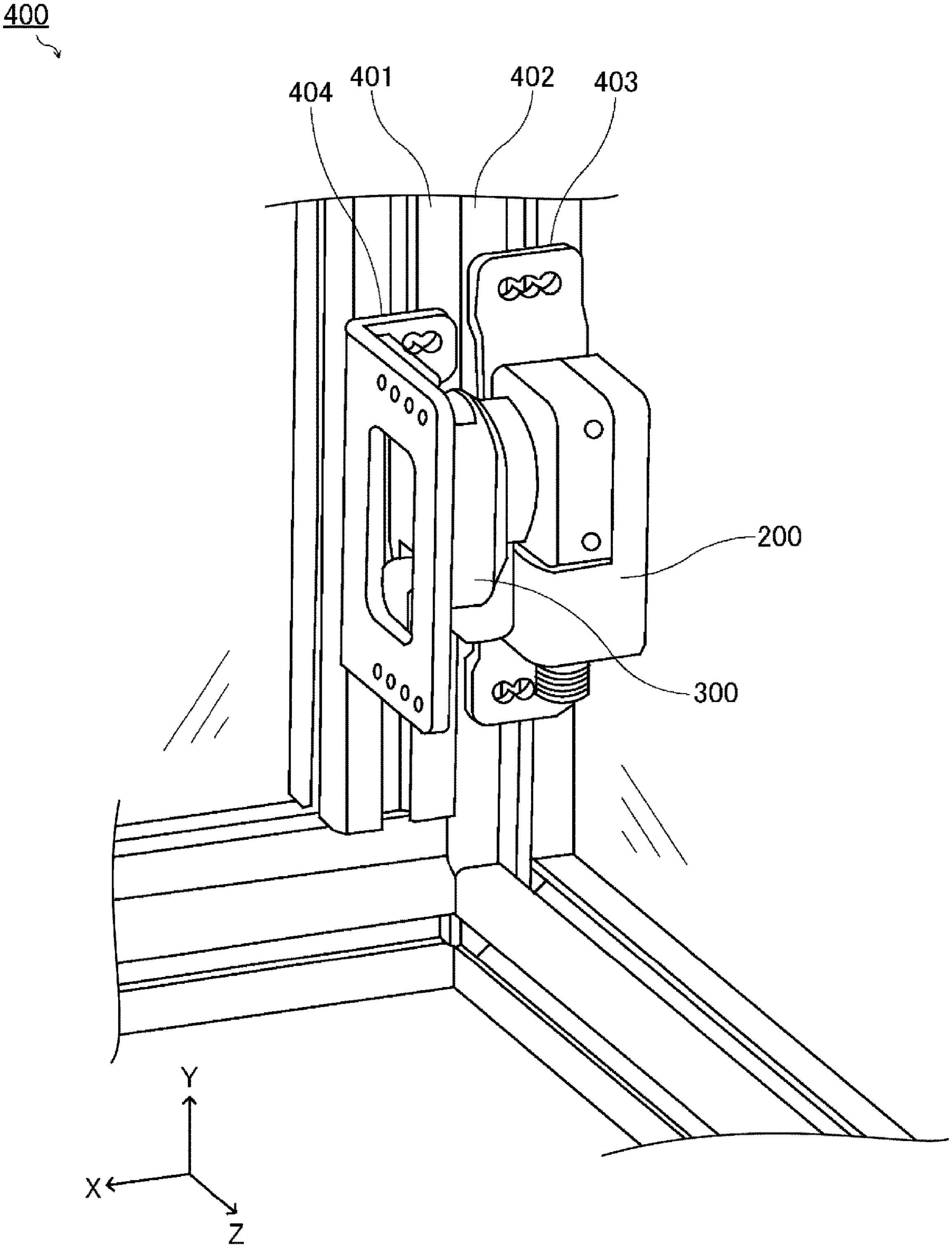
FIG. 1 is a view illustrating an application example of a safety switch.

FIG. 1 is a view illustrating an application example of a safety switch. FIG. 1 illustrates a guard 400 surrounding a mechanical hazard source such as a machine tool. The guard 400 is an example of safety protection using isolation, and a part (particularly, around a door where with a safety switch) of a surrounding box including an isolation wall is depicted in FIG. 1 as viewed from the inside of the surrounding box. However, the depiction of FIG. 1 is merely an example, and it can also be understood by replacing the isolation wall of FIG. 1 with an iron fence or the like.

FIG. 1 illustrates an X direction, a Y direction, and a Z direction orthogonal to each other. The X direction, the Y direction, and the Z direction all correspond arrangement postures of a safety switch 100 as will be described later.

The guard 400 includes a sliding door 401 as an openable and closable movable guard. A body portion of the door 401 may be made of a transparent resin, reinforced glass, or the like. The safety switch 100 is arranged such that a moving direction of the door 401 when the door 401 transitions from a closed state to an open state is the X direction in FIG. 1. When the safety switch 100 is arranged in this manner, a moving direction of the door 401 when the door 401 transitions from the open state to the closed state becomes a direction (—X direction) opposite to the X direction in FIG. 1.

The safety switch 100 includes a switch body 200 and an actuator 300.

The switch body 200 of the safety switch 100 is fixed to a support member 403 fixed to a lower portion of a door frame 402 of the guard 400. in this manner, the switch body 200 is desirably installed at the fixed door frame 402 instead of the door 401 that can be open and closed (moved). A screw for fixing the support member 403 to the door frame 402 of the guard 400 is omitted in the depiction of FIG. 1.

On the other hand, the actuator 300 of the safety switch 100 is fixed to a support member 404 fixed to a lower portion of a side surface of the door 401. A screw for fixing the support member 404 to the door 401 is omitted in the depiction of FIG. 1. Therefore, the actuator 300 is fixed to the switch body 200 so as to be relatively movable.

Note that, as a safety function contributing to a safety system, the safety switch 100 detects whether or not the actuator 300 is within a predetermined range with respect to the switch body 200, and outputs a detection result as a safety signal. The safety signal is also referred to as an output signal switching device (OSSD).

For example, when the door 401 of the guard 400 is closed, a radio frequency identification (RFID) of the actuator 300 provided in the door 401 approaches a detection unit (antenna coil) of the switch body 200 provided in the door frame 402. At this time, the switch body 200 detects that the actuator 300 is within the predetermined range with respect to the switch body 200 when the RFID is identified by the detection unit, and indirectly detects that the door 401 is closed. In this manner, the safety switch 100 is arranged so as to detect the open or closed state of the door 401 corresponding to the safety switch.

When the door 401 is open, a state in which the operation of the mechanical hazard source surrounded by the guard 400 is prohibited is formed. On the other hand, when the door 401 is closed, a state in which the operation of the machine tool surrounded by the guard 400 can be permitted (=a state satisfying one of operation permission conditions) is formed.

In this manner, the safety switch 100 is a device configured as a protective measure against the mechanical hazard source. In particular, the safety switch 100 is a type of safety protection by stopping. In this type, a peripheral region around the mechanical hazard source is defined, and the operation of a mechanical hazard source is stopped when detecting a state where a human body is likely to enter the peripheral region or the entry of the human body. In particular, in the safety system provided with the safety switch 100, the mechanical hazard source is stopped when a state where the door 401 is closed transitions to a state where the door 401 is open.

That is, in a "safe state", which is achieved while a state in which various conditions including the absence of an entry of a human body in the peripheral region and the like are satisfied is being maintained by closing of the door 401, the safety switch 100 outputs an ON signal as the OSSD, and the mechanical hazard source operates. On the other hand, when the door 401 is moved from the "safe state" so that the peripheral region is opened, the safety switch 100 outputs an OFF signal as the OSSD, and the mechanical hazard source stops.

In the entire safety system, once the OFF signal is output from the safety switch 100, the mechanical hazard source is not restarted even if the door 401 itself moves to a closed position, but is restarted when a reset signal is separately input. This is because, once the door 401 is opened, it is difficult to confirm the absence of an entry of a human body in the peripheral region even if the door 401 is closed thereafter.

Further, the safety switch 100 has a lock function for restricting opening of the door 401 in addition to the safety function.

For example, the safety switch 100 drives an electromagnet of the switch body 200 when receiving a lock input output from an external device in the state of indirectly detecting that the door 401 is closed by detecting the actuator 300 is within the predetermined range with respect to the switch body 200. At this time, an iron plate of the actuator 300 is magnetized. As a result, the electromagnet is attracted to the iron plate, whereby the opening of the door 401 is restricted. Note that the safety switch 100 may be configured not to unlock the door 401 unless a specific signal is input from the external device.

With the safety switch 100 having the lock function, it is possible to prevent, in advance, trouble that the mechanical hazard source stops based on the OSSD output every time a worker opens the door 401 by mistake.

In this manner, the lock function of the safety switch 100 can be understood as an auxiliary function (=non-safety function) for maintaining smooth operation of the mechanical hazard source. That is, the safety function of the safety system is realized only through the OSSD output of the safety switch 100.

<Mechanical Structure of Safety Switch>

Figure 2:
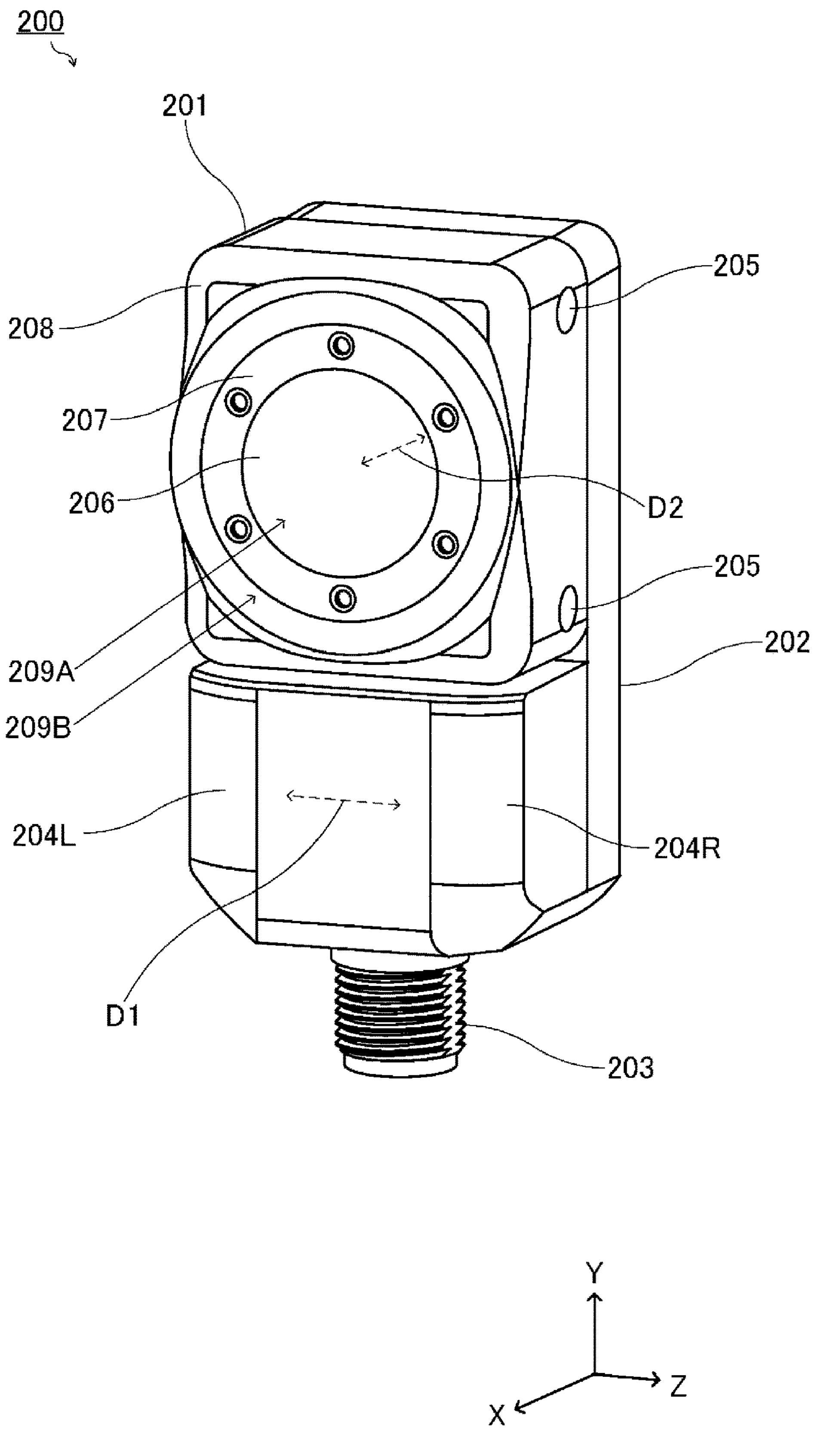
FIG. 2 is a perspective view illustrating an example of a switch body.

FIG. 2 is a perspective view illustrating an example of the switch body 200. An X direction, a Y direction, and a Z direction in FIG. 2 are orthogonal to each other. The X direction in FIG. 2 is the same as the X direction in FIG. 1. The Y direction in FIG. 2 is the same as the Y direction in FIG. 1. The Z direction in FIG. 2 is the same as the Z direction in FIG. 1.

The X direction corresponds to an arrangement posture of the safety switch 100, more specifically, an arrangement posture of the switch body 200 which is a portion of the safety switch 100. Specifically, an X-axis direction is an axial direction parallel to a normal direction of an attraction surface 209A. The X direction, which is one side of the X-axis direction, is a direction toward the attraction surface 209A from a coil provided in an electromagnet 201. An −X direction, which is the other side of the X-axis direction, is a direction opposite to the X direction.

The Y direction also corresponds to an arrangement posture of the safety switch 100, more specifically, an arrangement posture of the switch body 200 which is a portion of the safety switch 100. Specifically, a Y-axis direction is an axial direction along a longitudinal direction of the switch body 200. A −Y direction, which is one side of the Y-axis direction, is a direction in which a terminal 203 protrudes. The Y direction, which is the other side of the Y-axis direction, is a direction opposite to the −Y direction.

The Z direction also corresponds to an arrangement posture of the safety switch 100, more specifically, an arrangement posture of the switch body 200 which is a portion of the safety switch 100. A Z-axis direction is orthogonal to the X-axis direction and the Y-axis direction. The Z-axis direction includes the Z direction and a −Z direction which is a direction opposite to the Z direction.

Hereinafter, for convenience of description, the X direction is defined as a forward direction, the −X direction is defined as a rearward direction, the Y direction is defined as an upward direction, the −Y direction is defined as a downward direction, the Z direction is defined as a rightward direction, and the −Z direction is defined as a leftward direction. However, this example does not limit the arrangement postures of the safety switch 100.

The switch body 200 includes the electromagnet 201, a resin housing 202, and the terminal 203. The electromagnet 201 is provided on the front side of an upper portion of the resin housing 202. The upper portion of the resin housing 202 has a substantially rectangular parallelepiped shape. A back surface (rear surface) of the electromagnet 201 is in contact with and connected to a front surface of the upper portion of the resin housing 202. The attraction surface 209A and an attraction surface 209B of the electromagnet 201 and an attachment portion 205 are not covered with the resin housing 202 and are exposed outward.

A lower portion of the resin housing 202 has a substantially rectangular parallelepiped shape similarly to the upper portion of the resin housing 202. A back surface (rear surface) of the lower portion of the resin housing 202 forms the same plane as the back surface (rear surface) of the upper portion of the resin housing 202. A front surface of the lower portion of the resin housing 202 is located in the forward direction of the front surface of the upper portion of the resin housing 202. A bottom surface (lower surface) of the electromagnet 201 is in contact with an upper surface of the lower portion of the resin housing 202.

The terminal 203 protrudes in the downward direction from a bottom surface (lower surface) of the lower portion of the resin housing 202. A connector of a cable is connected to the terminal 203. The switch body 200 is electrically connected to the external device via the cable. The terminal 203 constitutes an output unit that outputs the safety signal.

On the front surface of the lower portion of the resin housing 202, a pair of indicator lamps 204L and 204R is provided separately in the leftward and rightward directions. Note that alphabets L and R following reference numerals are used to distinguish between a plurality of the same or similar members. The alphabets L and R are omitted when matters common to the plurality of members are described.

The resin housing 202 accommodates a detection unit that detects that the actuator 300 is within the predetermined range with respect to the switch body 200, a safety signal output unit that outputs the safety signal based on a detection result obtained by the detection unit, a control unit that supplies a drive signal to the electromagnet 201, and the like.

The electromagnet 201 has the attachment portion 205 that is formed to fix the switch body 200 to an installation place of the switch body 200 (for example, the door frame 402 illustrated in FIG. 1). In the example illustrated in FIG. 2, the attachment portion 205 is a screw hole extending along the leftward and rightward directions. Further, in the example illustrated in FIG. 2, two attachment portions 205 are provided on the right side of the electromagnet 201, and two attachment portions 205 are similarly provided on the left side of the electromagnet 201.

The switch body 200 may be directly attached to the installation place of the switch body 200 by the attachment portions 205, or may be attached to the support member 403 by the attachment portions 205 and indirectly attached to the installation place of the switch body 200 as in the example illustrated in FIG. 1.

In a case where the switch body 200 is directly attached to the installation place of the switch body 200, the installation place of the switch body 200 is desirably a metal member. In a case where the switch body 200 is attached to an intervening member, such as the support member 403, the intervening member is desirably a metal member. That is, the electromagnet 201 is desirably attached to the metal member by the attachment portion 205. In a case where such a configuration is adopted, heat dissipation of the electromagnet 201, which generates heat when driven, can be promoted.

Since the attachment portion 205 is formed on the electromagnet 201, a housing of the switch body 200 is not involved in fixing the switch body 200 to the installation place. Therefore, it is unnecessary to increase a size of the housing of the switch body 200 in order to satisfy required fixing strength and fixing positional accuracy. As a result, the switch body 200 and the safety switch 100 can be downsized.

Further. an attractive force applied to the electromagnet 201 by the lock function of the safety switch 100 is not applied to the housing of the switch body 200 since the attachment portion 205 is formed on the electromagnet 201. Therefore, the mechanical strength of the housing of the switch body 200 may be relatively low. That is, the housing of the switch body 200 is not necessarily a metal housing, and may be the resin housing 202 as in the example illustrated in FIG. 2. If the detection unit of the switch body 200 is a detection unit utilizing electromagnetic waves, the detection sensitivity of the detection unit is improved in a case where the resin housing 202 is used as the housing of the switch body 200 as compared with a case where the metal housing is used as the housing of the switch body 200.

The electromagnet 201 includes: a core portion 206 having a cylindrical shape; a bobbin 207 which is provided on the radially outer side of the core portion 206 and around which a coil is wound; and a yoke portion 208 provided on the radially outer side of the bobbin 207. When the electromagnet 201 is driven, a current flows in the coil wound around the core portion 206, and a magnetic field that attracts the electromagnet 201 and the iron plate 301 (see FIG. 5) of the actuator 300 is generated. Each of the core portion 206 and the yoke portion 208 is a magnetic body.

Note that a winding direction D1 of an antenna coil 263 (see FIGS. 7 and 8) accommodated in the resin housing 202 is desirably different from a winding direction D2 of the coil wound around the bobbin 207 of the electromagnet 201. As a result, the antenna coil 263 (see FIGS. 7 and 8) is less likely to be affected by magnetic field lines from the electromagnet 201, and thus, it is possible to improve the detection accuracy of the detection unit that detects that the actuator is within the predetermined range with respect to switch body 200.

The electromagnet 201 has the attraction surfaces 209A and 209B that can be attracted to an iron plate 301 (see FIG. 5) of the actuator 300. The attraction surface 209A is a front surface of the core portion 206. The attraction surface 209B is a frontmost surface of the yoke portion 208. A position of the attraction surface 209A in the forward and rearward directions and a position of the attraction surface 209B in the forward and rearward directions are the same. The attraction surface 209A has a circular shape, and the attraction surface 209B has an annular shape having a larger diameter than the circular shape and concentric with the circular shape.

Figure 3:
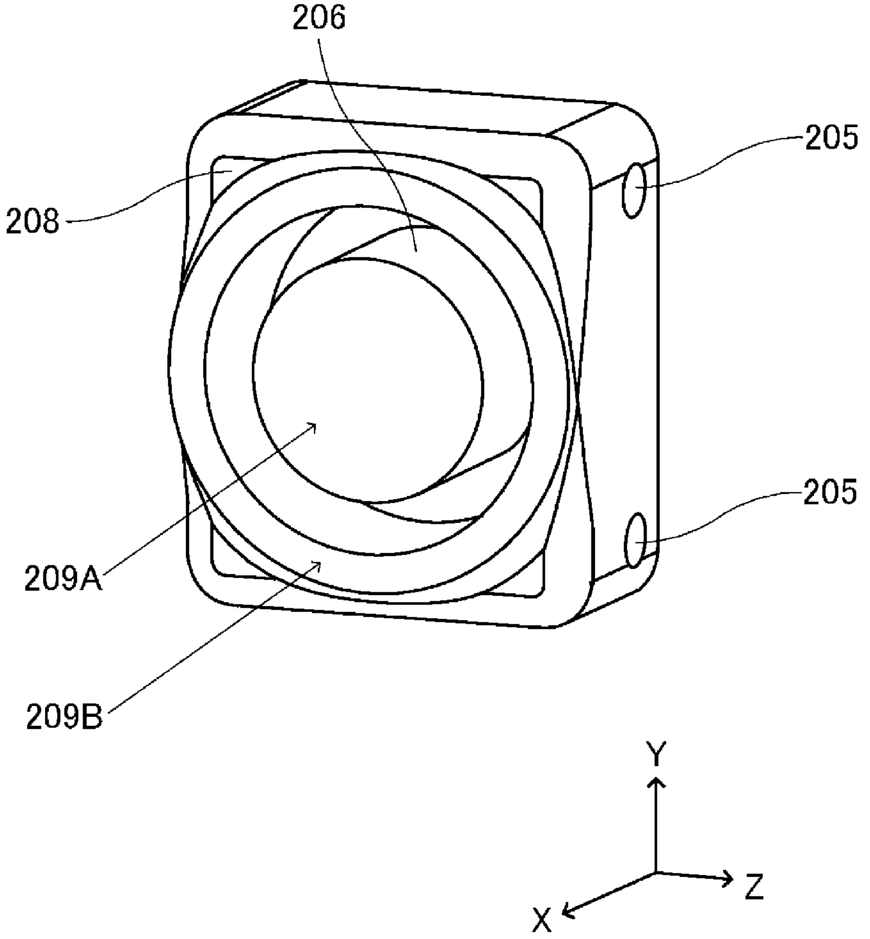
FIG. 3 is a perspective view illustrating an example of a core portion and a yoke portion.

The core portion 206 and the yoke portion 208 may be an integrated structural part as in the example illustrated in FIG. 3, or may be separate parts different from the example illustrated in FIG. 3.

Figure 4:
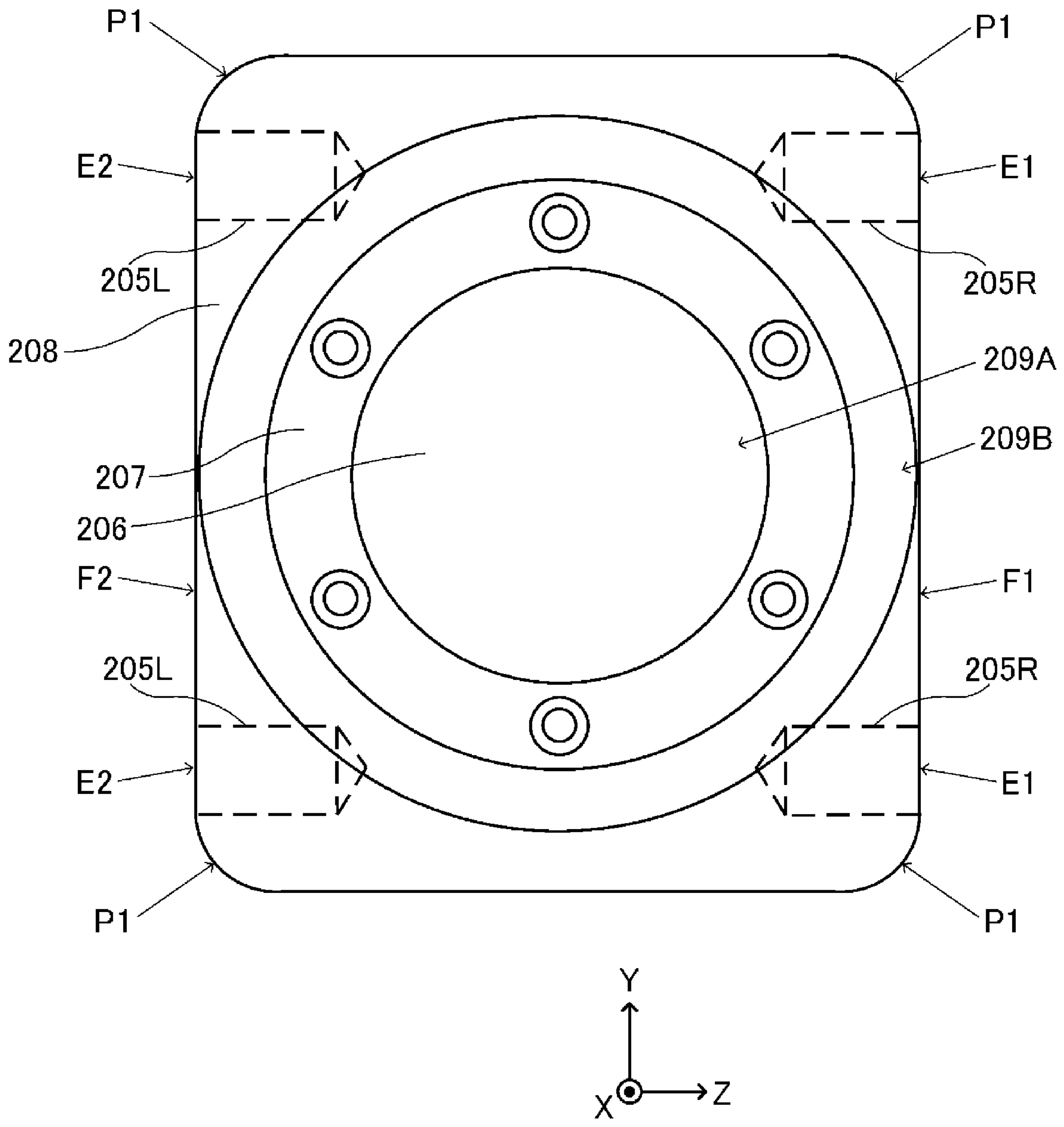
FIG. 4 is a front view of an electromagnet.

FIG. 4 is a front view of the above-described electromagnet 201. An upper right corner of the yoke portion 208 is a protrusion P1 protruding outward from the attraction surfaces 209A and 209B when the attraction surfaces 209A and 209B are viewed from the front. A lower right corner, a lower left corner, and an upper left corner of the yoke portion 208 are also the protrusions P1. That is, the electromagnet 201 includes the protrusions P1 protruding outward from the attraction surfaces 209A and 209B when the attraction surfaces 209A and 209B are viewed from the front.

A front surface of each of the protrusions P1 is located on the rear side the attraction surfaces 209A and 209B. That is, when the attraction surfaces 209A and 209B are attracted to the iron plate 301 (see FIG. 5) of the actuator 300, each of the protrusions P1 is spaced apart from the iron plate 301 (see FIG. 5) of the actuator 300 in the normal direction (the forward and rearward directions) of the attraction surfaces 209A and 209B.

In a case where a shape of the yoke portion 208 is designed to achieve an ideal state of magnetic field lines when the attraction surfaces 209A and 209B are attracted to the iron plate 301 (see FIG. 5) of the actuator 300, the density of magnetic field lines on the attraction surface 209B is substantially the same as the density of magnetic field lines at a central portion of the attraction surface 209A.

On the other hand, if it is configured such that the respective protrusions P1 are provided and the front surfaces of the respective protrusions P1 form substantially the same virtual plane as the attraction surfaces 209A and 209B, magnetic field lines unnecessarily spread in the yoke portion 208. As a result, the density of magnetic field lines on the attraction surface 209B becomes significantly lower than the density of magnetic field lines at the central portion of the attraction surface 209A, and an attractive force decreases. However, in a case where the front surfaces of the respective protrusions are located on the rear side of the attraction surfaces 209A and 209B as in the examples illustrated in FIGS. 2 and 3, the magnetic field lines when the attraction surfaces 209A and 209B are attracted to the iron plate 301 (see FIG. 5) of the actuator 300 can be brought close to the ideal state, and the density of the magnetic field lines on the attraction surface 209B can be brought close to the density of the magnetic field lines at the central portion of the attraction surface 209A. Therefore, it is possible to suppress a decrease in an attractive force.

The attachment portions 205 are provided on the protrusions P1, respectively. Since the attachment portions 205 are provided on the protrusions P1, it is possible to suppress the attachment portions 205 from interfering with the coil (the coil wound around the bobbin 207) of the electromagnet 201. This is because the attachment portion 205 is located on the outer side of the bobbin 207 and the coil of the electromagnet 201 when the attraction surfaces 209A and 209B are viewed from the front.

For example, even in a case where the attachment portion 205 is a screw hole extending from the front to the rear or a screw hole extending from the top to the bottom, different from the examples illustrated in FIGS. 2 to 4, it is possible to suppress the attachment portion 205 from interfering with the coil (the coil wound around the bobbin 207) of the electromagnet 201 as long as the attachment portion 205 is provided in the protrusion.

In the examples illustrated in FIGS. 2 to 4, ends E1 of two attachment portions 205R are provided on a right side surface F1 of the electromagnet 201 corresponding to an outer peripheral surface formed to surround a central axis intersecting the center of the attraction surfaces 209A and 209B, and ends E2 of remaining two attachment portions 205L are provided on a left side surface F2 of the electromagnet 201 similarly corresponding to the outer peripheral surface surrounding the central axis intersecting the center of the attraction surfaces 209A and 209B. According to such a configuration, it is possible to avoid providing the attachment portion on the back surface (rear surface) of the electromagnet 201. As a result, for example, the back surface (rear surface) of the electromagnet 201 can be used as a contact surface with the resin housing 202.

The resin housing 202 accommodates the detection unit that detects that the actuator 300 is within the predetermined range with respect to the switch body 200. It is desirable to arrange the detection unit as close as possible to the actuator 300 in order to increase the detection sensitivity of the detection unit. Therefore, it is desirable to arrange a frontmost surface of the resin housing 202 to be located slightly rearward of a frontmost surface of the electromagnet 201 and provide the detection unit at a position close to the frontmost surface of the resin housing 202. The reason why the frontmost surface of the resin housing 202 is arranged to be located slightly rearward of the frontmost surface of the electromagnet 201 is that there is a possibility that the electromagnet 201 is not attracted to the iron plate 301 (see FIG. 5) of the actuator 300 if the resin housing 202 comes into contact with the actuator 300 before the electromagnet 201 when the door is closed.

There is a case where a dimension of the resin housing 202 in the forward and rearward directions is larger than a dimension of the electromagnet 201 in the forward and rearward directions depending on shapes of parts accommodated in the resin housing 202. In such a case, if the frontmost surface of the electromagnet 201 and the frontmost surface of the resin housing 202 form substantially the same virtual plane, the back surface (rear surface) of the resin housing 202 is located behind the back surface (rear surface) of the electromagnet 201. Therefore, when a portion of the resin housing 202 is arranged behind the electromagnet 201 and the back surface (rear surface) of the electromagnet 201 is used as the contact surface with the resin housing 202, a rear space of the electromagnet 201 can be effectively utilized.

In the example illustrated in FIG. 1, the two attachment portions 205L are used to fix the switch body 200 to the door frame 402. On the other hand, in a case where the switch body 200 is inverted upside down from the example illustrated in FIG. 1, the two attachment portions 205R are used to fix the switch body 200 to the door frame 402.

The two attachment portions 205L are provided at separate protrusions (the upper left corner of the yoke portion 208 and the lower left corner of the yoke portion 208), respectively. As a result, a distance between the two attachment portions 205L can be increased, and the fixation using the two attachment portions 205L is stabilized.

The two attachment portions 205R are provided at separate protrusions (the upper right corner of the yoke portion 208 and the lower right corner of the yoke portion 208), respectively. As a result, a distance between the two attachment portions 205R can be increased, and the fixation using the two attachment portions 205R is stabilized.

Figure 5:
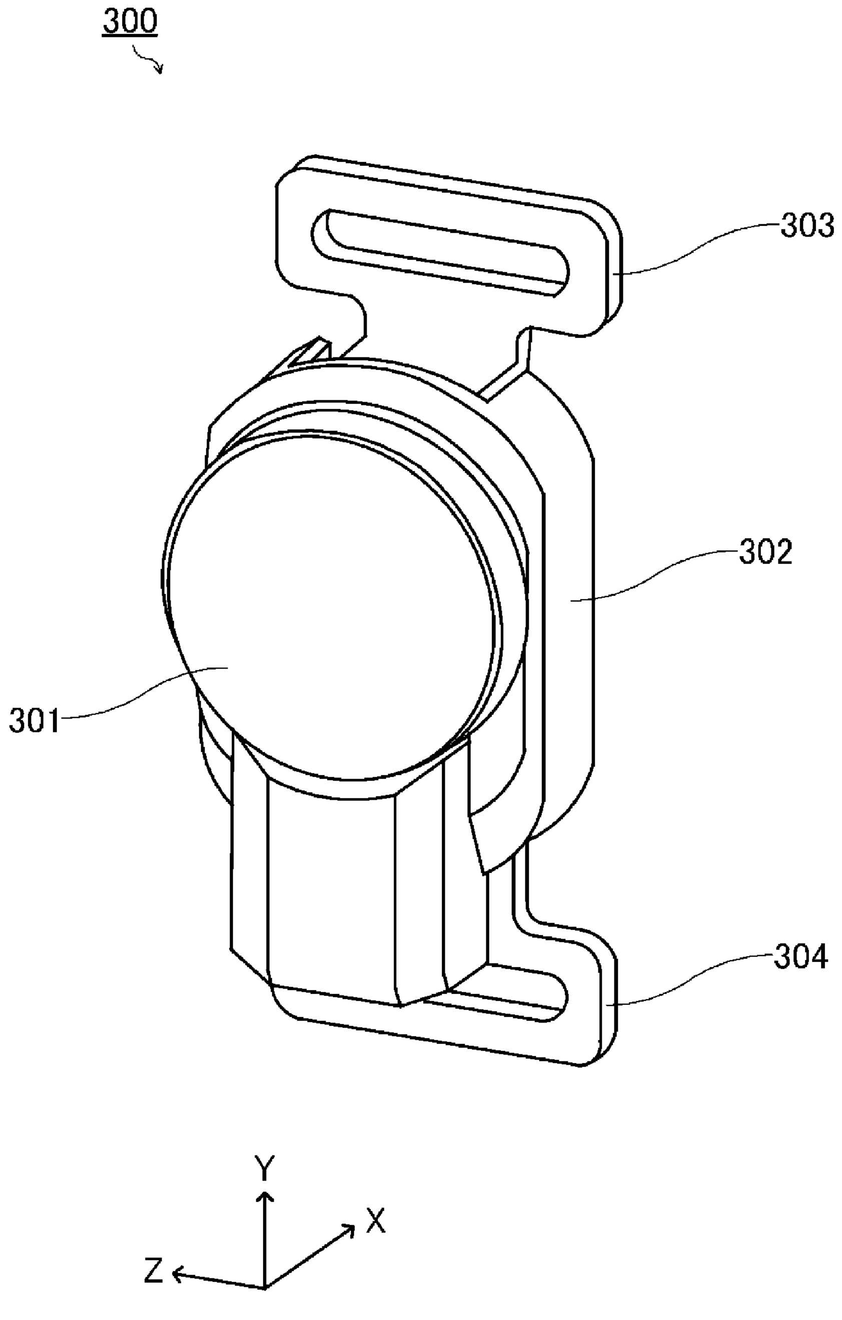
FIG. 5 is a perspective view illustrating an example of an actuator.

FIG. 5 is a perspective view illustrating an example of the actuator 300. The actuator 300 includes the iron plate 301, a metal housing 302, and attachment portions 303 and 304. The iron plate 301 is a member to be magnetized that is magnetized by the electromagnet 201. The attraction surface 209A and the attraction surface 209B of the electromagnet 201 correspond to a surface to be attracted formed on the iron plate 301, and the electromagnet 201 is attracted to the iron plate 301. The metal housing 302 accommodates a communication unit 310 (see FIG. 8) and the like. The attachment portions 303 and 304 are used to fix the actuator 300 to an installation place of the actuator 300 (for example, the door 401 illustrated in FIG. 1).

Another Example of Switch Body

Figure 6:
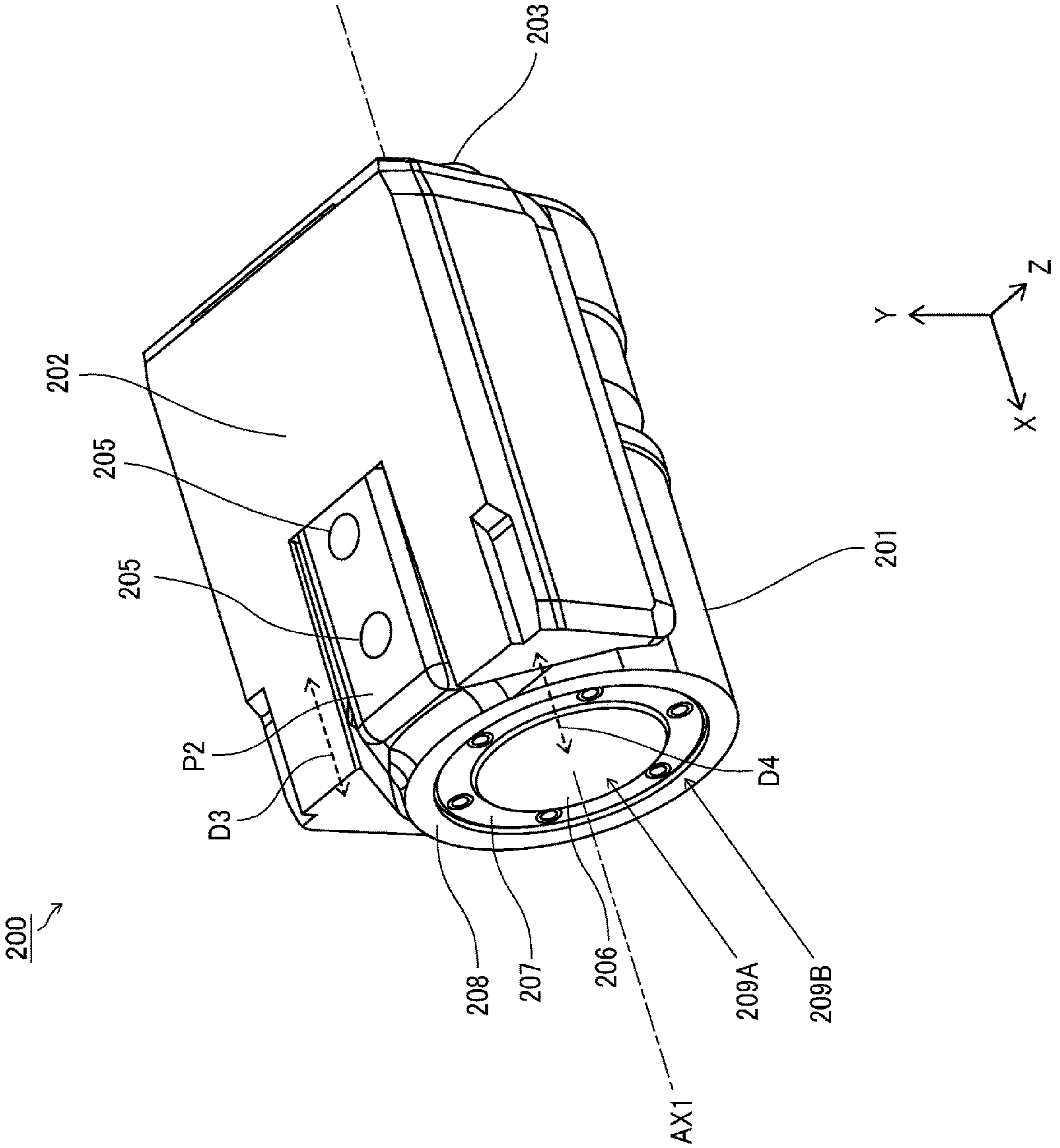
FIG. 6 is a perspective view illustrating another example of the switch body.

FIG. 6 is a perspective view illustrating another example of the switch body 200. In the switch body 200 of another example illustrated in FIG. 6, the same signs are given to the same portions as those of the switch body 200 of the example illustrated in FIG. 2. An actuator of a safety switch including the switch body 200 of another example illustrated in FIG. 6 is mainly installed on a hinged door, instead of a sliding door.

An X direction, a Y direction, and a Z direction in FIG. 6 are orthogonal to each other. The X direction, the Y direction, and the Z direction in FIG. 6 are not related to the X direction, the Y direction, and the Z direction in FIG. 1.

The X direction in FIG. 6 corresponds to an arrangement posture of the safety switch 100, more specifically, an arrangement posture of the switch body 200 which is a portion of the safety switch 100. Specifically, an X-axis direction is an axial direction parallel to a normal direction of an attraction surface 209A. The X direction, which is one side of the X-axis direction, is a direction toward the attraction surface 209A from a coil provided in an electromagnet 201. An −X direction, which is the other side of the X-axis direction, is a direction opposite to the X direction.

The Y direction in FIG. 6 also corresponds to an arrangement posture of the safety switch 100, more specifically, an arrangement posture of the switch body 200 which is a portion of the safety switch 100. Specifically, a Y-axis direction is an axial direction along a protruding direction of a protrusion P2 provided in the switch body 200. The Y direction, which is one side of the Y-axis direction, is a direction in which the protrusion P2 protrudes. A −Y direction, which is the other side of the Y-axis direction, is a direction opposite to the Y direction.

The Z direction in FIG. 6 also corresponds to an arrangement posture of the safety switch 100, more specifically, an arrangement posture of the switch body 200 which is a portion of the safety switch 100. A Z-axis direction is orthogonal to the X-axis direction and the Y-axis direction. The Z-axis direction includes the Z direction and a −Z direction which is a direction opposite to the Z direction.

Hereinafter, for convenience of description, the X direction is defined as a forward direction, the −X direction is defined as a rearward direction, the Y direction is defined as an upward direction, the −Y direction is defined as a downward direction, the Z direction is defined as a rightward direction, and the −Z direction is defined as a leftward direction. However, this example does not limit installation directions of the switch body 200 of another example illustrated in FIG. 6.

The electromagnet 201 includes the protrusion P2 protruding outward (upward) from the attraction surfaces 209A and 209B when the attraction surfaces 209A and 209B are viewed from the front. On an upper surface of the protrusion P2, ends of the two attachment portions 205 are provided along a central axis AX1 extending in the forward and rearward directions intersecting the center of the attraction surfaces 209A and 209B. In the example illustrated in FIG. 6, the attachment portion 205 is a screw hole extending along the upward and downward directions.

In order to reduce a size of an outer shape of the switch body 200 of another example illustrated in FIG. 6 when the attraction surfaces 209A and 209B are viewed from the front, a winding direction of the antenna coil 263 (see FIGS. 7 and 8) accommodated in the resin housing 202 and a winding direction of a coil wound around the bobbin 207 of the electromagnet 201 need to be the same direction (the forward and rearward directions). Therefore, in the switch body 200 of another example illustrated in FIG. 6, a winding direction D3 of the antenna coil 263 (see FIGS. 7 and 8) accommodated in the resin housing 202 and a winding direction D4 of the coil wound around the bobbin 207 of the electromagnet 201 are set to the forward and rearward directions.

However, in a case where the winding direction of the antenna coil 263 (see FIGS. 7 and 8) and the winding direction of the coil wound around the bobbin 207 of the electromagnet 201 are the same direction, there is a possibility that the antenna coil 263 is affected by the electromagnet 201 to generate a stronger magnetic flux so that the detection accuracy of a detection unit deteriorates.

Figure 7:
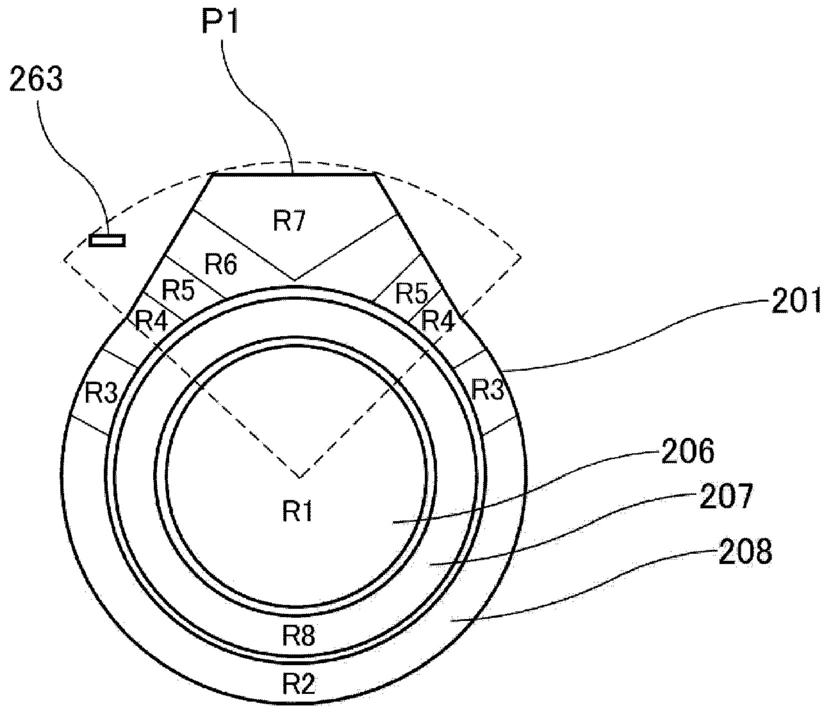
FIG. 7 is a view illustrating a density distribution of magnetic field lines in the electromagnet.

In the switch body 200 of another example illustrated in FIG. 6, the deterioration in the detection accuracy of the detection unit is suppressed by providing the antenna coil 263 at a position illustrated in FIG. 7. Specifically, the antenna coil 263 is provided such that, when the attraction surfaces 209A and 209B are viewed from the front, the attraction surface 209A is circular, a distance between the antenna coil 263 and the center of the circle in a radial direction of the circle is equal to or less than a distance between a tip portion of the protrusion P2 and the center of the circle in the radial direction of the circle, and a position of the antenna coil 263 in a circumferential direction of the circle overlaps a position of the protrusion P2 in the circumferential direction of the circle. That is, the antenna coil 263 is provided inside a fan shape depicted by a dotted line in FIG. 7.

FIG. 7 is a view illustrating a density distribution of magnetic field lines in the electromagnet 201. First to eighth regions R1 to R8 are classified based on the magnitude of the density of magnetic field lines. As the ordinal number attached to the head of a name of a region is larger, the region has a lower density of magnetic field lines. Since the density of magnetic field lines is low in the vicinity of the protrusion P2 due to the influence of the protrusion P2, the deterioration in the detection accuracy of the detection unit is suppressed by providing the antenna coil 263 in the vicinity of the protrusion P2 (specifically, inside the fan shape drawn by the dotted line in FIG. 7).

The switch body 200 of another example illustrated in FIG. 6 has a feature that the attachment portion 205 is provided on the protrusion P2 and a feature that the antenna coil 263 is provided in the vicinity of the protrusion P2. Note that the feature that the attachment portion 205 is provided on the protrusion P2 and the feature that the antenna coil 263 is provided in the vicinity of the protrusion P2 are not directly related to each other. Therefore, as a modification of the switch body 200, the switch body 200 may be configured to have the feature that the antenna coil 263 is provided in the vicinity of the protrusion P2 without having the feature that the attachment portion 205 is provided on the protrusion P2.

<Electrical Structure of Safety Switch>

Figure 8:
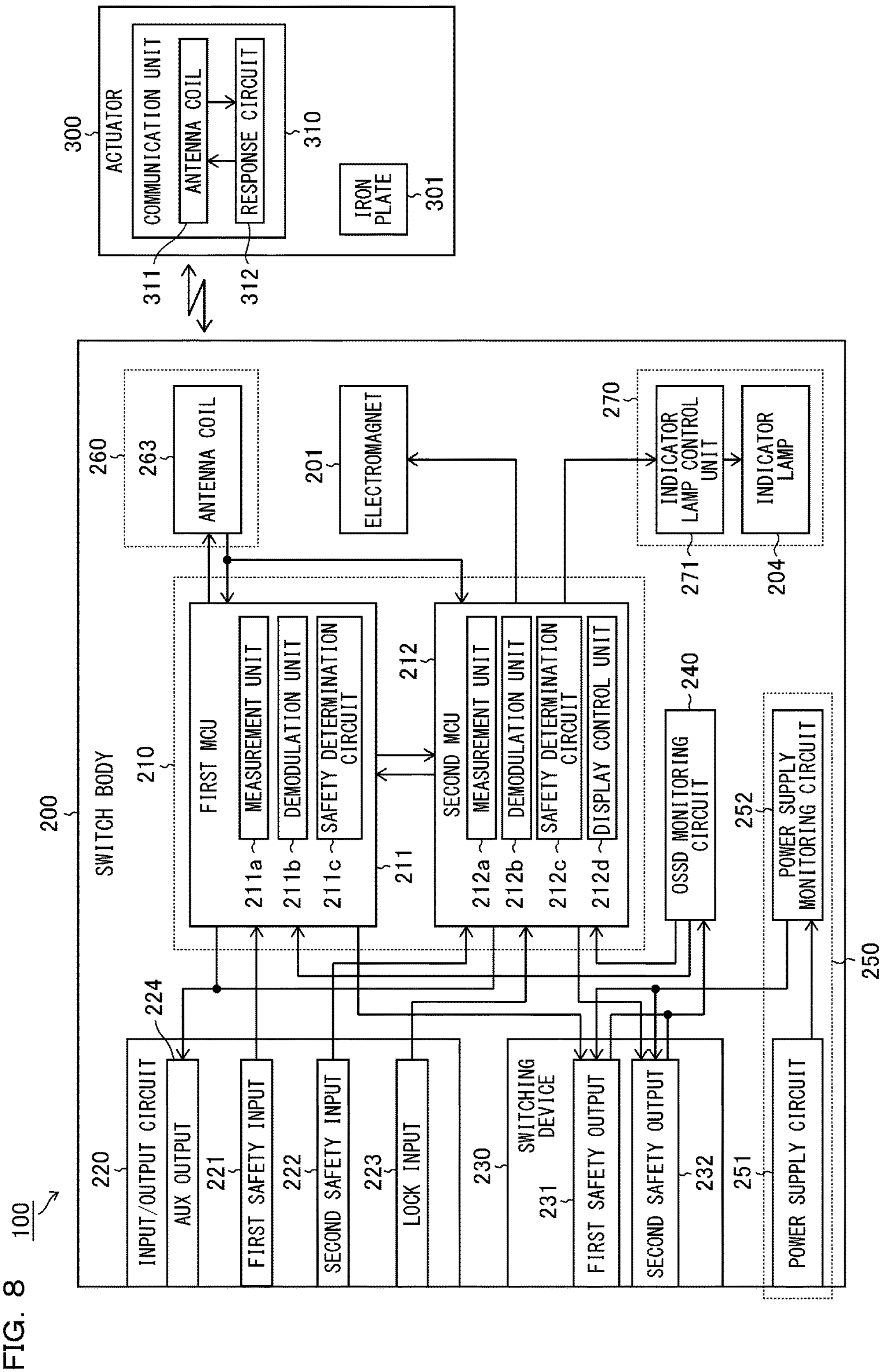
FIG. 8 is a diagram illustrating a functional block of the safety switch.

FIG. 8 is a diagram illustrating a functional block of the safety switch 100. In the safety switch 100 of a configuration example illustrated in FIG. 8, the switch body 200 includes a control circuit 210, an input/output circuit 220, a switching device 230, an OSSD monitoring circuit 240, a power supply unit 250, a communication unit 260, a display unit 270, and the electromagnet 201. In this drawing, constituent elements provided close to the actuator 300 among constituent elements of the switch body 200 are collectively depicted on the left side of the block. Further, constituent elements provided far from the actuator 300 among the constituent elements of the switch body 200 are collectively depicted on the right side of the block.

The control circuit 210 includes a first micro controller unit (MCU) 211 and a second MCU 212. The input/output circuit 220 includes a first safety input unit 221, a second safety input unit 222, a lock input unit 223, and an auxiliary (AUX) output unit 224. The switching device 230 serving as the safety signal output unit includes a first safety output unit 231 and a second safety output unit 232. The power supply unit 250 includes a power supply circuit 251 and a power supply monitoring circuit 252. The communication unit 260 includes the antenna coil 263 configured to transmit and receive a wireless signal to and from the communication unit 310 (FIG. 8) of the actuator 300. The display unit 270 includes an indicator lamp control unit 271 and the indicator lamp 204. The lock input unit 223 receives a lock instruction for locking movement of the actuator 300 with respect to the switch body 200.

Further, in the safety switch 100 of the configuration example illustrated in FIG. 8, the actuator 300 includes the communication unit 310 and the iron plate 301. Note that the communication unit 310 includes an antenna coil 311 and a response circuit 312.

The first MCU 211 and the second MCU 212 communicate with each other to monitor each other. The first MCU 211 and the second MCU 212 are connected to the antenna coil 263.

The first MCU 211 drives the antenna coil 263, and transmits a wireless signal from the antenna coil 263 to the communication unit 310 (in particular, the antenna coil 311) of the actuator 300. The communication unit 310 may be a wireless tag (RF-ID tag).

The response circuit 312 operates using an induced current generated in the antenna coil 311 as a power source. Further, the response circuit 312 demodulates the wireless signal received by the antenna coil 311 to acquire information, and further transmits the wireless signal (response signal) via the antenna coil 311.

Each of the first MCU 211 and the second MCU 212 receives the wireless signal (response signal) transmitted from the antenna coil 311 of the actuator 300 via the antenna coil 263.

The first MCU 211 includes a measurement unit 211*a*, a demodulation unit 211*b*, and a safety determination circuit 211*c*. Further, the second MCU 212 includes a measurement unit 212*a*, a demodulation unit 212*b*, a safety determination circuit 212*c*, and a display control unit 212*d*. The second MCU 212 functions as a drive control unit that controls driving of the electromagnet 201, and controls the driving of the electromagnet 201 based on the lock instruction received via the lock input unit 223.

Each of the measurement units 211*a* and 212*a* measures the intensity of the wireless signal (response signal) received via the antenna coil 263, and estimates an inter-coil distance d (and further, a distance from the switch body 200 to the actuator 300) between the antenna coil 263 of the switch body 200 and the antenna coil 311 of the actuator 300 based on a result of the measurement. Note that the antenna coil 263 is included in the detection unit that detects that the actuator 300 is within the predetermined range with respect to the switch body 200. Further, instead of the inter-coil distance d, the intensity of the wireless signal may be directly used to sense a position of the actuator 300.

Further, a technique for detecting that the actuator 300 is within the predetermined range with respect to the switch body 200 is not limited to the above-described technique using the antenna coil 263. For example, a detection principle may be adopted in which a physical switch is provided in the switch body 200, and the physical switch is pressed by a protruding member or the like provided in the actuator 300 when a door is closed and the actuator 300 approaches the switch body 200.

The antenna coil 263 desirably has a winding direction different from that of the coil wound around the bobbin 207 of the electromagnet 201. As a result, the antenna coil 263 is less likely to be affected by the magnetic field lines from the electromagnet 201, and thus, the detection accuracy of the detection unit is improved.

Each of the demodulation units 211*b* and 212*b* demodulates information conveyed by the wireless signal (response signal) received via the antenna coil 263, and identifies the actuator 300 based on the information. Note that this information may include unique identification information (ID information).

The safety determination circuit 211*c* of the first MCU 211 determines whether the inter-coil distance d measured by the measurement unit 211*a* is equal to or less than a threshold dth, and transmits a result of the determination to the second MCU 212. Similarly, the safety determination circuit 212*c* of the second MCU 212 determines whether the inter-coil distance d measured by the measurement unit 212*a* is equal to or less than the threshold dth, and transmits a result of the determination to the first MCU 211. Then, each of the safety determination circuits 211*c* and 212*c* determines that the actuator 300 is in a state (door closed state) of being within the predetermined range with respect to the switch body 200 when the determination result of the own unit coincides with the determination result of the counterpart (when both the units determine that the inter-coil distance d is equal to or less than the threshold dth).

In the input/output circuit 220, the first safety input unit 221 and the second safety input unit 222 are input circuits configured for a serial cascade connection of the plurality of safety switches 100. For example, the first safety input unit 221 and the second safety input unit 222 are connected to the first safety output unit 231 and the second safety output unit 232, respectively, of another safety switch 100 provided on the upstream side.

The first MCU 211 is connected to the first safety input unit 221. When the ON signal is input through the first safety input unit 221, the first MCU 211 controls the first safety output unit 231 based on a proximity state of the actuator 300 (=the open or closed state of the door) and a locked state of the electromagnet 201. On the other hand, when the OFF signal is input through the first safety input unit 221, the first MCU 211 causes the first safety output unit 231 to output the OFF signal without depending on the proximity state of the actuator 300 and the locked state of the electromagnet 201.

Similarly, the second MCU 212 is connected to the second safety input unit 222. When the ON signal is input through the second safety input unit 222, the second MCU 212 controls the second safety output unit 232 based on the proximity state of the actuator 300 and the locked state of the electromagnet 201. On the other hand, when the OFF signal is input through the second safety input unit 222, the second MCU 212 causes the second safety output unit 232 to output the OFF signal without depending on the proximity state of the actuator 300 and the locked state of the electromagnet 201.

As a result, the plurality of safety switches 100 can be connected in a cascade. When any one of the plurality of safety switches 100 is not in the safe state, the OFF signal is output to an external device. Therefore, for example, in a case where a plurality of doors are provided for an iron fence surrounding a mechanical hazard source, the operation of the mechanical hazard source is not possible unless all the doors are in the safe state. On the other hand, when all of the plurality of safety switches 100 are in the safe state, the ON signal is output to the external device.

The lock input unit 223 is connected to, for example, another safety switch 100 provided on the upstream side, and transmits upstream communication data (including the lock input) and receives downstream communication data (including bundle data of an AUX output).

The AUX output unit 224 is connected to, for example, another safety switch 100 provided on the downstream side, and transmits downstream communication data (including bundle data of an AUX output) and receives upstream communication data (including the lock input).

For example, the control circuit 210 generates downstream communication data based on communication data (=communication data obtained by bundling upstream AUX outputs) received via the lock input unit 223 and a state of the own safety switch 100, and outputs the downstream communication data from the AUX output unit 224.

Each of the first safety output unit 231 and the second safety output unit 232 outputs an OSSD output (OSSD1_O and OSSD2_O) to, for example, another safety switch 100 provided on the downstream side.

For example, the control circuit 210 outputs the OSSD outputs (OSSD1_O and OSSD2_O) from the first safety output unit 231 and the second safety output unit 232, respectively, based on OSSD inputs (OSSD1_I and OSSD2_I) received via the first safety input unit 221 and the second safety input unit 222, respectively, and a proximity state of the actuator 300 (=a detection result obtained by the detection unit).

In the switching device 230, the first safety output unit 231 and the second safety output unit 232 can be configured as, for example, an open collector output circuit using a PNP transistor. In this case, when the PNP transistor is turned on, a positive-side power supply is connected to an output terminal, so that the ON signal (=high level) is output. On the other hand, when the PNP transistor is turned off, the output terminal is grounded via a pull-down resistor, so that the OFF signal (=low level) is output.

Note that each of the first safety output unit 231 and the second safety output unit 232 can also be configured as an open collector output circuit using an NPN transistor. In this case, output logic levels are reversed from the above. Specifically, the ON signal becomes a low level, and the OFF signal becomes a high level.

The OSSD monitoring circuit 240 may be connected to each of the first safety output unit 231 and the second safety output unit 232. The OSSD monitoring circuit 240 is connected to the first MCU 211 and the second MCU 212. The first MCU 211 monitors whether the operation of the second safety output unit 232 is normal through the OSSD monitoring circuit 240. The second MCU 212 monitors whether the operation of the first safety output unit 231 is normal through the OSSD monitoring circuit 240.

For example, each of the first safety output unit 231 and the second safety output unit 232 periodically shifts the output signal to OFF for a minute time when outputting the ON signal. The OSSD monitoring circuit 240 determines that the OSSD is normal if the OFF for the minute time can be detected during an output period of the ON signal, and determines that the OSSD is not normal if the OFF for the minute time cannot be detected.

Note that a case where the ON signal continues is caused by a short circuit between the output terminal and the positive-side power supply. In this case, the safety determination circuits 211*c* and 212*c* output control signals for outputting the OFF signal to the first safety output unit 231 and the second safety output unit 232, respectively. As a result, the normal one of the first safety output unit 231 and the second safety output unit 232 outputs the OFF signal.

The external device is in a state of being capable of permitting the operation of the mechanical hazard source only during a period in which both the first safety output unit 231 and the second safety output unit 232 output the ON signals. In other words, the external device does not permit the operation of the mechanical hazard source during a period in which at least one of the first safety output unit 231 and the second safety output unit 232 outputs the OFF signal. Note that the external device is configured not to react to the OFF for the minute time during the ON signal described above.

In the power supply unit 250, the power supply circuit 251 is a DC-DC converter that receives supply of an input voltage VCC (for example, DC+24 V) and a ground voltage GND (for example, 0 V) from the outside and generates a desired output voltage VREG (for example, DC+10 V, +5 V, or +3.3 V). Note that the power supply circuit 251 supplies power to each unit (=all circuits that require power) of the switch body 200.

Meanwhile, when the input voltage VCC or the output voltage VREG is not within a predetermined range, there is a possibility that the first MCU 211, the second MCU 212, and the like do not normally operate. Therefore, the power supply monitoring circuit 252 determines whether the input voltage VCC and the output voltage VREG are within the predetermined range, and outputs a determination result to the first safety output unit 231 and the second safety output unit 232.

When receiving the determination result indicating that the power supply circuit 251 is not normally operating, each of the first safety output unit 231 and the second safety output unit 232 outputs the OFF signal without depending on the control signal output from each of the first MCU 211 and the second MCU 212.

On the other hand, when receiving the determination result indicating that the power supply circuit 251 is normally operating, each of the first safety output unit 231 and the second safety output unit 232 outputs the ON signal or the OFF signal depending on the control signal output from each of the first MCU 211 and the second MCU 212.

Based on an instruction from the control circuit 210 (for example, the display control unit 212*d* of the second MCU 212), the indicator lamp control unit 271 turns on or off or causes blinking in green or blinking in red of the indicator lamp 204 according to the proximity state of the actuator 300 (=the open or closed state of the door) and the locked or unlocked state of the electromagnet 201.

Further, the indicator lamp control unit 271 turns on or off or causes blinking in green or blinking in red of the indicator lamp 272 according to the OSSD output, INPUT signal, the locked state or unlocked state, and the like. Note that the above OSSD output is an output signal of each of first safety output unit 231 and second safety output unit 232.

The electromagnet 201 generates a magnetic force by a drive signal (drive current) supplied from the control circuit 210 (for example, the second MCU 212). At this time, the iron plate 301 (see FIG. 5) of the actuator 300 close to the switch body 200 is magnetized. As a result, the door is locked by the attractive force between the electromagnet 201 and the iron plate 301.

Conclusion

Hereinafter, various embodiments described above will be comprehensively described.

For example, a safety switch disclosed in the present specification has a configuration (first configuration) provided with: a detection unit that detects that a movable actuator is within a predetermined range, the actuator includes a member to be magnetized on which a surface to be attracted is formed; a safety signal output unit that outputs a safety signal based on a detection result obtained by the detection unit; an electromagnet on which an attraction surface corresponding to the surface to be attracted is formed; a lock input unit that receives a lock instruction for locking movement of the actuator; a drive control unit that drives the electromagnet to cause the attraction surface of the electromagnet and the surface to be attracted of the actuator to be attracted to each other based on the lock instruction received via the lock input unit; and an attachment portion which is formed on the electromagnet and fixes a switch body to an installation place of the switch body.

The safety switch having the first configuration may have a configuration (second configuration) in which the electromagnet has a protrusion formed to protrude outward from the attraction surface when the attraction surface is viewed from the front, and the attachment portion is provided on the protrusion.

The safety switch having the second configuration may have a configuration (third configuration) in which the protrusion is formed on the electromagnet such that the protrusion is spaced apart from the member to be magnetized in a normal direction of the attraction surface when the attraction surface and the surface to be attracted are attracted to each other.

The safety switch having any one of the first to third configurations may have a configuration (fourth configuration) in which the electromagnet has an outer peripheral surface formed to surround a central axis intersecting a center of the attraction surface, and an end of the attachment portion is provided on the outer peripheral surface.

The safety switch having any one of the first to fourth configurations may have a configuration (fifth configuration) in which a resin housing that accommodates the detection unit, the output unit, and the drive control unit is provided, the electromagnet is connected to the resin housing, and the attraction surface and the attachment portion formed on the electromagnet are exposed.

The safety switch having the fifth configuration may have a configuration (sixth configuration) in which an output unit that is formed in the resin housing and outputs the safety signal is provided.

The safety switch having any one of the first to fourth configurations may have a configuration (seventh configuration) in which the detection unit includes a first coil for transmission and reception of a wireless signal to detect that the actuator is within the predetermined range, the electromagnet includes a second coil that is driven by the drive control unit to generate a magnetic field for causing the attraction surface of the electromagnet and the surface to be attracted of the actuator to be attracted to each other, and the first coil and the second coil are wound in different directions.

The safety switch having the seventh configuration may have a configuration (eighth configuration) in which a resin housing that accommodates the detection unit is provided, and the attraction surface formed on the electromagnet and the attachment portion are exposed.

The safety switch having any one of the first to sixth configurations may have a configuration (ninth configuration) in which the detection unit includes a first coil for transmission and reception of a wireless signal to detect that the actuator is within the predetermined range, the electromagnet includes a protrusion protruding outward from the attraction surface when the attraction surface is viewed from the front, the first coil is provided such that, when the attraction surface is viewed from the front, the attraction surface is circular, a distance between the first coil and a center of the circle in a radial direction of the circle is equal to or less than a distance between a tip portion of the protrusion and the center of the circle in the radial direction of the circle, and a position of the first coil in a circumferential direction of the circle overlaps a position of the protrusion in the circumferential direction of the circle.

The safety switch having the ninth configuration may have a configuration (tenth configuration) in which the electromagnet includes a second coil that is driven by the drive control unit to generate a magnetic field for causing the attraction surface of the electromagnet and the surface to be attracted of the actuator to be attracted to each other, and the first coil and the second coil have winding directions identical to each other.

The safety switch having any one of the first to tenth configurations may have a configuration (eleventh configuration) in which the electromagnet is attached to the metal member through the attachment portion.

The safety switch having any one of the first to eleventh configurations may have a configuration (twelfth configuration) in which the drive control unit drives the electromagnet to cause the attraction surface of the electromagnet and the surface to be attracted of the actuator to be attracted to each other based on the detection result obtained by the detection unit and the lock instruction received via the lock input unit.

<Other Modifications>

Note that, in addition to the above-described embodiments, various alterations can be applied to various technical features disclosed in the present specification within a scope not departing from the spirit of the technical creation. That is, it is to be understood that the above-described embodiments are illustrative in all respects and not restrictive, and the technical scope of the invention is defined by the claims, and includes all alterations falling within the meaning and scope equivalent to the claims

What is claimed is:

1. A safety switch comprising:

a detection unit that detects that a movable actuator is within a predetermined range, the movable actuator includes a member to be magnetized on which a surface to be attracted is formed;

a safety signal output unit that outputs a safety signal based on a detection result indicating whether the movable actuator is within the predetermined range, obtained by the detection unit;

an electromagnet on which an attraction surface corresponding to the surface to be attracted is formed;

a lock input unit that receives a lock instruction for locking movement of the movable actuator;

a drive control unit that drives the electromagnet to cause the attraction surface of the electromagnet and the surface to be attracted of the movable actuator to be attracted to each other based on the lock instruction received via the lock input unit; and an attachment portion which is formed on the electromagnet and fixes a switch body to an installation place of the switch body, wherein the attachment portion is formed on a magnetic body of the electromagnet, and the magnetic body comprises a yoke portion of the electromagnet.

2. The safety switch according to claim 1, wherein the electromagnet includes a protrusion formed to protrude outward from the attraction surface when the attraction surface is viewed from a front, and the attachment portion is provided on the protrusion.

3. The safety switch according to claim 2, wherein the protrusion is formed on the electromagnet in such a manner that the protrusion is spaced apart from the member to be magnetized in a normal direction of the attraction surface when the attraction surface and the surface to be attracted are attracted to each other.

4. The safety switch according to claim 1, wherein the electromagnet has an outer peripheral surface formed to surround a central axis intersecting a center of the attraction surface, and an end of the attachment portion is provided on the outer peripheral surface.

5. The safety switch according to claim 1, further comprising a resin housing that accommodates the detection unit, the output unit, and the drive control unit, wherein the electromagnet is connected to the resin housing, and the attraction surface and the attachment portion formed on the electromagnet are exposed.

6. The safety switch according to claim 5, further comprising an output unit that is formed on the resin housing and outputs the safety signal.

7. The safety switch according to claim 1, wherein the detection unit includes a first coil for transmission and reception of a wireless signal to detect that the movable actuator is within the predetermined range, the electromagnet includes a second coil that is driven by the drive control unit to generate a magnetic field for causing the attraction surface of the electromagnet and the surface to be attracted of the movable actuator to be attracted to each other, and the first coil and the second coil are wound in different directions.

8. The safety switch according to claim 7, further comprising a resin housing that accommodates the detection unit, wherein the attraction surface and the attachment portion formed on the electromagnet are exposed.

9. The safety switch according to claim 1, wherein the detection unit includes a first coil for transmission and reception of a wireless signal to detect that the movable actuator is within the predetermined range, the electromagnet includes a protrusion formed to protrude outward from the attraction surface when the attraction surface is viewed from a front, the first coil is provided in such a manner that, when the attraction surface is viewed from the front, the attraction surface is circular, a distance between the first coil and a center of the circle in a radial direction of the circle is equal to or less than a distance between a tip portion of the protrusion and the center of the circle in the radial direction of the circle, and a position of the first coil in a circumferential direction of the circle overlaps a position of the protrusion in the circumferential direction of the circle.

10. The safety switch according to claim 9, wherein the electromagnet includes a second coil that is driven by the drive control unit to generate a magnetic field for causing the attraction surface of the electromagnet and the surface to be attracted of the movable actuator to be attracted to each other, and the first coil and the second coil have winding directions identical to each other.

11. The safety switch according to claim 1, wherein the electromagnet is attached to a metal member through the attachment portion.

12. The safety switch according to claim 1, wherein the drive control unit drives the electromagnet to cause the attraction surface of the electromagnet and the surface to be attracted of the movable actuator to be attracted to each other based on the detection result obtained by the detection unit and the lock instruction received via the lock input unit.

13. The safety switch according to claim 1, wherein the attachment portion is a plurality of attachment portions formed on the magnetic body of the electromagnet.

14. A safety switch comprising:

a detection unit that detects that a movable actuator is within a predetermined range, the movable actuator includes a member to be magnetized on which a surface to be attracted is formed;

a safety signal output unit that outputs a safety signal based on a detection result indicating whether the movable actuator is within the predetermined range, obtained by the detection unit;

an electromagnet on which an attraction surface corresponding to the surface to be attracted is formed;

a lock input unit that receives a lock instruction for locking movement of the movable actuator;

a drive control unit that drives the electromagnet to cause the attraction surface of the electromagnet and the surface to be attracted of the movable actuator to be attracted to each other based on the lock instruction received via the lock input unit; and an attachment portion which is formed on the electromagnet and fixes a switch body to an installation place of the switch body, wherein the electromagnet has an outer peripheral surface formed to surround a central axis intersecting a center of the attraction surface, and an end of the attachment portion is provided on the outer peripheral surface.

15. A safety switch comprising:

a detection unit that detects that a movable actuator is within a predetermined range, the movable actuator includes a member to be magnetized on which a surface to be attracted is formed;

a safety signal output unit that outputs a safety signal based on a detection result indicating whether the movable actuator is within the predetermined range, obtained by the detection unit;

an electromagnet on which an attraction surface corresponding to the surface to be attracted is formed;

a lock input unit that receives a lock instruction for locking movement of the movable actuator;

a drive control unit that drives the electromagnet to cause the attraction surface of the electromagnet and the surface to be attracted of the movable actuator to be attracted to each other based on the lock instruction received via the lock input unit;

an attachment portion which is formed on the electromagnet and fixes a switch body to an installation place of the switch body; and a resin housing that accommodates the detection unit, the output unit, and the drive control unit, wherein the electromagnet is connected to the resin housing, and the attraction surface and the attachment portion formed on the electromagnet are exposed.

* * * * *